United States Patent
Zhu et al.

(10) Patent No.: US 7,346,678 B1
(45) Date of Patent: Mar. 18, 2008

(54) SYSTEM AND METHOD FOR MONITORING AND MANAGING A COMPUTING SERVICE

(75) Inventors: Min Zhu, Los Altos, CA (US); Jinyu Yang, Fremont, CA (US)

(73) Assignee: Web EX Communications, Inc., San Jose, CA (US)

( * ) Notice: Subject to any disclaimer, the term of this patent is extended or adjusted under 35 U.S.C. 154(b) by 887 days.

(21) Appl. No.: 10/298,105

(22) Filed: Nov. 14, 2002

(51) Int. Cl.
*G06F 11/30* (2006.01)

(52) U.S. Cl. ............... 709/224; 709/204; 709/205; 715/753; 715/759

(58) Field of Classification Search ............... 709/202, 709/224, 223, 204–206; 715/753–759
See application file for complete search history.

(56) References Cited

U.S. PATENT DOCUMENTS

| | | |
|---|---|---|
| 5,511,185 A | 4/1996 | Weinbaum et al. |
| 5,870,559 A | 2/1999 | Leshem et al. |
| 5,958,008 A | 9/1999 | Pogrebisky et al. ........ 709/223 |
| 5,974,572 A | 10/1999 | Weinberg et al. ............. 714/47 |
| 6,138,157 A | 10/2000 | Welter et al. ................ 709/224 |
| 6,144,962 A | 11/2000 | Weinberg et al. ............. 707/10 |
| 6,205,122 B1 | 3/2001 | Sharon et al. ............... 370/254 |
| 6,360,332 B1 | 3/2002 | Weinberg et al. ............. 714/4 |
| 6,449,739 B1 * | 9/2002 | Landan ........................ 714/47 |
| 6,738,933 B2 * | 5/2004 | Fraenkel et al. ............. 714/47 |
| 6,792,460 B2 * | 9/2004 | Oulu et al. .................. 709/224 |
| 6,799,213 B1 * | 9/2004 | Zhao et al. .................. 709/224 |
| 6,892,236 B1 * | 5/2005 | Conrad et al. ............... 709/224 |
| 6,973,489 B1 * | 12/2005 | Levy ........................... 709/224 |
| 2002/0198984 A1 * | 12/2002 | Goldstein et al. ............ 709/224 |
| 2002/0198985 A1 * | 12/2002 | Fraenkel et al. ............. 709/224 |

OTHER PUBLICATIONS

Mercury Interactive Corporation Fact Sheet, "Topaz Business Availability," Mercury Interactive Corporation, 2002, pp. 1-2.
Mercury Interactive Corporation Fact Sheet, "Topaz Diagnostics," Mercury Interactive Corporation, 2001, pp. 1-2.
Mercury Interactive Corporation Fact Sheet, "Topaz for SLM," Mercury Interactive Corporation, 2002, pp. 1-2.
Mercury Interactive Corporation Fact Sheet, "Topaz ActiveAgent," Mercury Interactive Corporation, 2001, pp. 1-2.
Mercury Interactive Corporation Fact Sheet, "Topaz Auto RCA," Mercury Interactive Corporation, 2002, pp. 1-2.

(Continued)

*Primary Examiner*—Kenneth R. Coulter
(74) *Attorney, Agent, or Firm*—Orrick, Herrington & Sutcliffe LLP (57) ABSTRACT

A system and method for monitoring and managing a computing service are disclosed. In one embodiment, an agent is installed at each of a plurality of clients. These agents periodically test performance of services of one or more application servers over a network. The agents then transmit the results of the tests to a management server. The management server also receives information regarding actual services delivered to users from the one or more application servers. Customers may then access the management server to obtain system information.

12 Claims, 5 Drawing Sheets

OTHER PUBLICATIONS

Mercury Interactive Corporation Fact Sheet, "Topaz Console," Mercury Interactive Corporation, 2001, pp. 1-2.
Mercury Interactive Corporation Fact Sheet, "Topaz Observer," Mercury Interactive Corporation, 2001, pp. 1-2.
Mercury Interactive Corporation Fact Sheet, "Topaz Open DataSource," Mercury Interactive Corporation, 2001, 1 p.
Mercury Interactive Corporation Fact Sheet, "Topaz Prism," Mercury Interactive Corporation, 2001, pp. 1-2.
Mercury Interactive Corporation Fact Sheet, "Topaz Rent-a-POP," Mercury Interactive Corporation, 2001, pp. 1-2.
Mercury Interactive Corporation, "Topaz SiteScope," Mercury Interactive Corporation, 2002, pp. 1-2.
Mercury Interactive Corporation Fact Sheet, "Topaz WeatherMap," Mercury Interactive Corporation, 2002, pp. 1-2.
Mercury Interactive Corporation "Freshwater SiteScope," Mercury Interactive Corporation, 2002, 1 p.

* cited by examiner

SYSTEM AND METHOD FOR MONITORING AND MANAGING A COMPUTING SERVICE

TECHNICAL FIELD

The present invention relates to monitoring and managing a computing service and in particular to monitoring and managing a collaborative computing service.

BACKGROUND

Over the years, computer systems have assumed a growing role in business. Recently, there has been an increase in the use of computers to facilitate provision of certain services over a network, such as the Internet. These services may include, for example, collaborative computing services that enable and manage on-line meetings. The types of services provided may vary from service provider to service provider. Moreover, some on-line service providers provide services of different types.

Commonly, on-line service providers employ a client/server architecture to provide on-line services over a network. In some configurations, such services are provided over the Internet by a server cluster hosted by a service provider. Users of these network services typically connect to the server cluster through the Internet using a conventional web browser, such as Internet Explorer™ by Microsoft Corporation. Other suitable web browsers or applications may alternatively be employed to connect to and exchange data with the server cluster.

After the user has connected to the server cluster, the user may exchange data with the server cluster using the web browser, a native client application, or both. Assuming that the user can establish a connection with the server cluster and can access and use the various services provided by the server cluster with an acceptable degree of latency, the user can properly receive such services.

Occasionally, however, there may be service disruptions. The sources of these disruptions may vary. For example, the network connection between the service provider and the user may be down or may be operating with significant latency. Even if there is an effective network connection, delivery of the on-line services may be impaired by disruptions at the user, at the service provider, or both. In some circumstances, some services may be delivered without disruption, while delivery of other services is significantly impaired.

Conventional systems monitor web site performance by transmitting a browser web page request, such as an HTTP request, and receiving and analyzing the associated HTTP responses. This monitoring, however, is not performed from within a user's local area network (LAN) or from behind a user's firewall, and therefore cannot detect disruptions that are caused, at least in part, to issues unique to the user's LAN or firewall. Thus, monitoring performance of an on-line service from a location other than the user's location may not accurately reveal performance of the on-line service at the user's location.

Users, particularly IT staff of users, frequently need to monitor more than merely the HTTP responses from a web site to effectively monitor the ability of the system to effectively provide the on-line services. For example, where the on-line services include text chat, document sharing, or the like, users need to monitor or measure the performance of these services. By simply monitoring responses to standard HTTP requests, conventional systems are unable to effectively monitor the performance of on-line services.

Further, conventional monitoring systems typically do not monitor or report on usage of the on-line service or services by individual users, and therefore are generally unable to evaluate customer usage of the on-line service or services.

Additionally, these conventional monitoring systems do not monitor actual customer use of one or more on-line services. Hence, information describing such actual customer use is unavailable to customers using such conventional monitoring systems.

Additional background details regarding conventional monitoring systems are disclosed in U.S. Pat. Nos. 5,511,185, 5,870,559, 5,958,008, 5,974,572, 6,138,157, 6,144,962, 6,205,122, and 6,360,332, the disclosures of all of which are expressly incorporated herein by reference.

SUMMARY

A need exists, therefore, for a system and method for monitoring and managing an on-line service that monitors performance of the on-line service to particular users at particular locations. Another need exists to provide a user with improved monitoring and performance information regarding the provision of on-line services to the user. An additional need exists to provide customers with information describing actual uses of the services delivered to individual users at the customer.

In one embodiment, an agent application is downloaded or otherwise installed at a client device at each user. Each agent application then periodically establishes a network connection to a server cluster hosting on-line services and initiates actions simulating user interaction with various of the on-line services provided by server cluster and collects performance information associated with simulated interaction. The agent then transmits such performance information over the Internet to a management server. The management server processes and saves the performance information. Users, as well as the service provider, may access the performance information at the management server to monitor or determine system performance. If the performance information is outside predetermined limits, the management server may transmit an alert message to the user, the service provider, or both.

According to some embodiments, one function of the agent is to determine performance of one or more on-line services. The agent is configured to simulate user's actions by performing many of the tasks a user may perform in accessing and using the on-line service. For example, where the on-line service comprises a collaborative computing service, the agent may be configured to simulate loading web pages, logging into a web site, downloading a plug-in, starting a session or meeting, joining a previously-started meeting, text chatting, polling, sharing applications, and the like. The agent then measures performance of these services.

The agent may be configured to periodically run, such as running once every few minutes. Each time the agent runs, the agent performs a sequence of actions for each site monitored. The monitoring interval may be changed as well as the specific sites or services monitored by the agent.

Moreover, in some embodiments, the agent calls a client application to perform certain tests. The client application functionality may be employed by the agent to simulate actual user use of the client application in receiving certain on-line services.

Pursuant to some embodiments, the management server receives information regarding actual services provided to users from the server cluster and consolidates information received from the remote agents at the various user locations along with information from the server cluster. Staff of the service provider as well as users may then access the management server to obtain performance data and statistics regarding the delivered services.

According to some embodiments, the management server transmits alert messages to customers, to the service provider, or others upon identifying a service disruption based upon data received from one or more of the agents. This alert message may be sent via email or otherwise.

In an alternate embodiment, the agent is incorporated into a client application, which receives services from the server cluster. In this embodiment, the agent monitors and records performance of actual services delivered and transmits the recorded performance data to the management server.

Additional details and features of the present system and method will be apparent from the following detailed description and the accompanying drawings.

DETAILED DESCRIPTION

Environment

Figure 1:
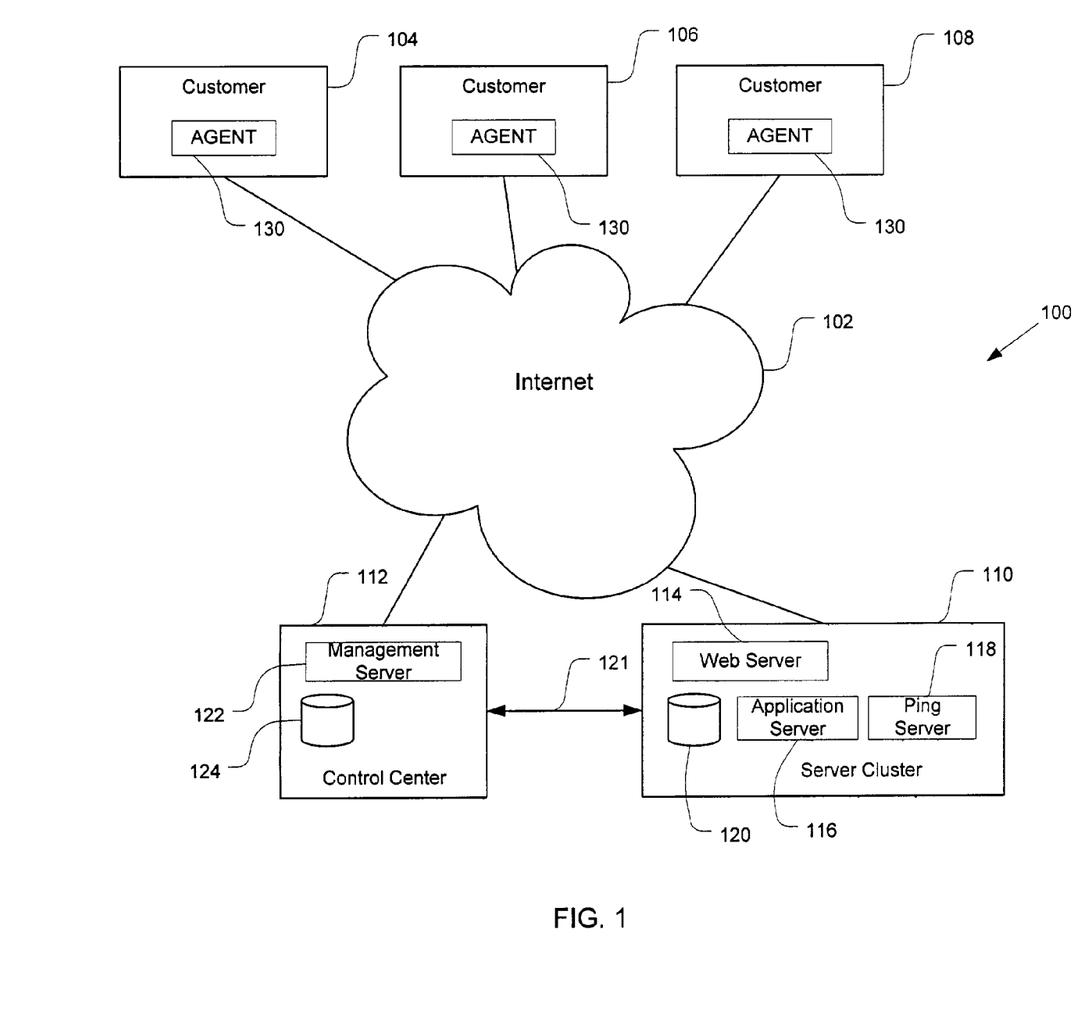
FIG. 1 is a schematic diagram illustrating a network in accordance with an embodiment of the present invention.

FIG. 1 illustrates a system 100 including a network 102, customer sites 104, 106, 108, a server cluster 110, and a control center 112. The network 102 may comprise a Wide Area Network (WAN), such as at least a portion of the Internet. Each of the customer sites 104, 106, 108 is connected to the network 102 and may each include a Local Area Network (LAN) (not shown). Further, the customer sites 104, 106, 108 may be connected to the network 102 through one or more proxy servers, gateway devices, firewall devices, or the like (not shown) positioned between the respective customer site 104, 106, 108 and the network 102.

The server cluster 110 includes a web server 114, an application server 116, a ping server 118, and a cluster database 120. In one embodiment, multiple server clusters 110 may be connected to the network 102. Optionally or additionally, the server cluster 110 may comprise multiple ones of servers 114, 116, 118 and databases 120. The configuration shown in FIG. 1 is merely a simplified example configuration to illustrate details of embodiments of the present invention.

The web server 114 is operable to transmit data, including web pages, over the network 102 to the customer sites 104, 106, 108 and to receive information from the customer sites 104, 106, 108 from over the network 102. Optionally, the web server 114 may also be configured to transmit data over the network 102 to the control center 112. Alternately, the server cluster 110 and the control center 112 may exchange data over a link 121 that does not require the data to be transmitted over the network 102. The cluster database 120 stores data regarding actual services delivered by the server cluster 110 to customers. For example, the cluster database 120 may store information regarding start and end times for delivery of certain services, customer usage of the services for a particular time frame, history tracking of specific customer uses of service by individual user and time of use, and the like.

The ping server 118 is shown as comprising a part of the server cluster 110. In one embodiment, the ping server 118 receives a data packet from one of the agents 130 and, in response, returns an IP address of the application server 116 to which the agent 130 may attempt to connect. Additional details regarding the ping server 118 are discussed below.

The control center 112 includes a management server 122 and a management database 124. The management server 122 is connected to the network 102 and is configured to exchange data with the customer sites 104, 106, 108 and the server cluster 110. The configuration of the management server 122 can vary. In one embodiment, the management server 122 comprises an Apache HTTP server and a MySQL database server, and includes PHP pages. The management database 124 may comprise a MySQL database and stores performance information and statistics regarding the services delivered to the customer sites 104, 106, 108 over the network 102 from the server cluster 110. The control center 112 and the server cluster 110 may comprise portions of a service provider network.

Each of the customer sites 104, 106, 108 includes at least one agent 130. Each agent 130 may comprise a software application installed at a client computer, such as a personal computer, connected to a local area network of one of the customer sites 104, 106, 108. The agent 130 may be written in C++ or in other suitable language. Also connected to the local area network (not shown) of each customer site 104, 106, 108 is one or more client computers that are configured to receive actual services from the server cluster 110.

Pursuant to one embodiment, the agent 130 may be installed at each customer site 104, 106, 108 by downloading the agent 130 from the management server 122 and then installing the agent 130 at a client computer at the customer sites 104, 106, 108. In this embodiment, a user at a client computer at one of the customer sites 104, 106, 108 browses to a web page served by the management server 112 at a particular URL (Uniform Resource Locator), logs on to the management server 112, such as by password or the like. Once the user has logged onto the management server 112, the user then downloads and installs the agent 130. The agent 130 may be installed by using ActiveX technology. Alternately, the agent 130 may be installed by copying the executable files to the client computer at the customer sites 104, 106, 108 and then installing the executable files.

In some embodiments, the agent 130 is installed on a dedicated client computer, such as a personal computer, (not shown) at the customer sites 104, 106, 108, although the computer on which the agent 130 is installed may also perform other functions.

Once the agent 130 is installed at one or more customer sites 104, 106, 108, the management server 122 downloads configuration information to the agent 130. The configuration information may include information regarding how frequently the agent 130 will perform the testing procedure, the location of the agent 130, locations of other agents 130 at different sites of the same customer, and the like. In other embodiments, an individual user at the client computer where the agent 130 is installed may manually enter the configuration information.

In operation, the agent 130, installed at one of the customer sites 104, 106, 108, connects to the server cluster 110, such as by establishing a connection with the web server 114. The agent 130 then tests the web server 130 as described in more detail below. Next, the agent 130 tests the ping server 118 as described in more detail below. The agent 130 then connects to the application server 116 and tests services available from the application server 116. For example, where the application server 116 provides on-line meeting services, the agent 130 may test these services by creating a new meeting, joining an existing meeting, performing text chat, performing video conferencing, performing document sharing, performing application sharing, and the like using the application server 116. Additional details regarding the testing of the application server are discussed below. Thus, the agent 130 tests real-time functionality of the services provided by the application server 116 by transmitting data to the application server 116 similar, or identical, to data that would be transmitted by an actual user using these services.

The agent 130 collects the results of these tests and transmits the results over the network 102 to the management server 122. The management server 122 may also receive information describing actual services delivered to users at the customer sites 104, 106, 108 from the server cluster 110. The management server 122 stores the results received from the agents 130 and the server cluster 110 and processes these results to generate status reports and statistics regarding the services delivered by the server cluster 110. Users at the customer sites 104, 106, 108, or elsewhere, may access these status reports, statistics, and the like by logging onto the management server 122 and requesting the same. In response, the management server 122 transmits the requested information over the network 102. The management sever 122 may transmit the requested information in a web page or in any other suitable format. In one embodiment, the management server 122 transmits the requested information via HTTPS.

Agent

Figure 2:
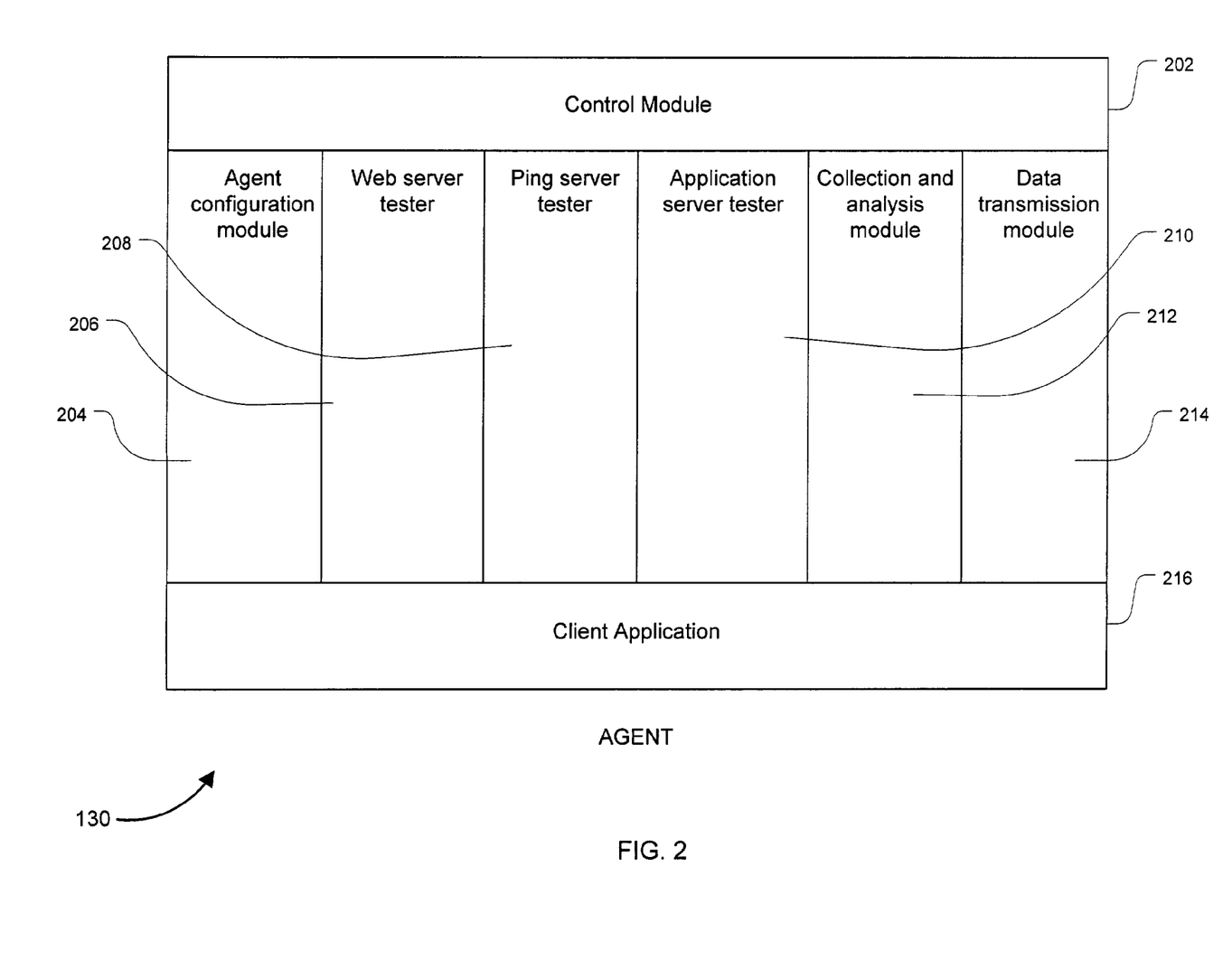
FIG. 2 illustrates details of a FIG. 1 agent in accordance with an embodiment of the present invention.

FIG. 2 illustrates details of one example embodiment of a FIG. 1 agent 130. The agent 130 includes a control module 202, an agent configuration engine 204, a web server tester 206, a ping server tester 208, an application server tester 210, a collection and analysis module 212, a data transmission module 214, and a client application 216. The control module 202 controls operation of the agent 130 and commences operation of the various modules or testers and manages the workflow of the agent 130. The control module 202 may include a timer for measuring the interval between consecutive tests.

The agent configuration module 204 receives and maintains configuration information relating to the agent 130. The configuration information may include, for example, the frequency or interval with which the agent 130 runs tests, the specific site or sites to be tested by the agent 130, specific services to be tested by the agent 130, the location of the agent 130, and the like. In one embodiment, the configuration module 204 receives configuration information downloaded from the management server 122 over the network 102 to the agent 130. Optionally, the configuration module 204 received configuration information input from a user at the computer at which the agent 130 is installed.

The web server tester 206 tests the web server 114 (FIG. 1) over the network 102. In one embodiment, the web server tester 206 tests functions of the web server 114. For example, the web server tester 206 may test the ability of the web server 114 to serve a web page, to permit user log in to the site, to download a plug-in, and to receive information for initiating delivery of an on-line service.

In one embodiment, the web server tester 206 transmits an HTTP request to the web server 114 and receives a web page from the web server 114. The web page server tester 206 then inspects and analyzes the web page received from the web server 114 to determine whether the received web page includes certain predetermined elements. For example, if the received web page contains frames, or different sections, the web server tester 206 determines whether each of the frames or sections includes correct information. The web page server tester 206 also transmits login information to the web server 114 to test the login functionality of the web server 114. The content of the login information may vary. In one embodiment, the login information includes a username and a password. The web page server tester 206 then receives a response from the web server 114 to the transmitted login information and analyzes the response to determine the operability of the Additionally, the web server tester 206 tests the performance of the web server 114 (FIG. 1) in downloading a plug-in or other file. In this regard, the web server tester 206 transmits information to the web server 114 over the network 102 (FIG. 1) requesting download of a plug-in or other file. In response, the web server 114 commences download of the requested plug-in or other file if this functionality is operable. The web server tester 206 receives the downloaded plug-in or other file. The web server tester 206 may then analyze the plug-in or other file, as well as any associated latency, to evaluate the success of the download.

In some embodiments, the web server tester 206 also tests the functionality of the web server 114 (FIG. 1) to receive and process information for commencing delivery of an on-line service. Pursuant to an example implementation involving provision of on-line meeting services, the web server tester 206 transmits information necessary to create a new meeting to the web server 114 and analyzes the response to evaluate the functionality of this feature of the web server 114.

The results obtained by the web server tester 206 may be used to determine the operability of certain functions of the web server 114 (FIG. 1). In addition, the client 130 may use these results in estimating the latency of the network 102 (FIG. 1) as well as the latency of the web server 114. For example, the client 130 may estimate the latency of the network 102 by measuring the time difference between sending a TCP SYN packet to the web server 114 over the network 102 and receiving an ACK packet from the web server 114 in response. Assuming the delay by the web server 114 in transmitting the ACK packet to be substantially constant, small, or negligible, the time difference measured at the agent 130 between sending the TCP SYN packet and receiving the ACK packet may be used to estimate network latency in the path between the agent 130 and the web server 114.

Additionally, once a session is established between the agent 130 and the web server 114 (FIG. 1), the agent 130 transmits an HTTP Get Method for a Uniform Resource Locator (URL) to the web server 114 over the network 102. The web server 114 then processes this request and transmits a response over the network 102 to the agent 130. The delay measured at the agent 130 between the transmission of the HTTP Get Method for a URL and the receipt of the response from the web server 114, minus the previously-calculated network latency estimate, may be used as an estimate of the latency of the web server 114. Those skilled in the art will appreciate that the latency of the web server 114 may be subject to and affected by a variety of factors.

The ping server tester 208 performs a ping test of the ping server 118 (FIG. 1). The ping server tester 208 transmits a data packet over the network 102 to the ping server 118 and waits to receive a response from the ping server 118. The data packet transmitted by the ping server tester 208 may comprise an Internet Control Message Protocol (ICMP) echo request. Upon receiving the response from the ping server 118, the ping server tester 208 confirms the operability of the ping server 118. The agent 130 may also estimate network latency data by measuring the time between transmitting the data packet over the network 102 and receiving the response from the ping server 118. In one embodiment, the ping server 118 returns an IP address of the application server 116 to the agent 130.

The application server tester 210 tests the operability and performance of the application server 116 (FIG. 1) by simulating a user's actions in the delivery of on-line services provided by the application server 116. The application server tester 210 may use the client application 216 to simulate the user's actions. In one embodiment, the client application 216 comprises a set of dynamic link library (DLL) programs, which may be called by the application server tester 210 in simulating user actions to test the application server 116. In one embodiment, the DLL programs are similar or identical to programs usable by actual users in receiving the services delivered by the application server 116.

For example, to test an application server 116 configured to deliver on-line meeting services, the application server tester 210 uses selective ones of the DLL programs to test associated services provided by the application server 116. To test text chatting services of the application server 116, for example, the application server tester 210 calls one or more of the DLL programs associated with receiving text chatting services and uses these DLL programs to simulate user actions in receiving text chatting services. The application server tester 210 exchanges data from the application server 116 during the test and, based on this data, determines the operability of this specific service or function and may also determine any associated latency. The application server tester 210 may then use other DLL programs to test other of the services provided by the application server 116, such as joining a meeting, application sharing, video conferencing, and the like.

The collection and analysis module 212 collects and analyzes the results of the web server tester 206, the ping server tester 208, and the application server tester 210. In one embodiment, the collection and analysis module 212 collects latency data associated with one or more of the servers in the cluster 110 and latency data associated with the network 102. Further, the collection and analysis module 212 collects operability data for each of the services tested. The operability data may include information regarding which of the services tested was operable or satisfactorily completed the test.

The data transmission module 214 transmits test result data from the agent 130 over the network 102 (FIG. 1) to the control center 112, where the test result data is received at the management server 122. This may be performed by calling a certain URL to write the test result data, including latency data, to the management server 122. Pursuant to one embodiment, the data transmission module 214 transmits the test result data to the management server 122 via HTTPS (Hypertext Transfer Protocol over Secure Socket Layer) protocol, which may also be referred to as "HTTP over SSL."

Management Server

Figure 3:
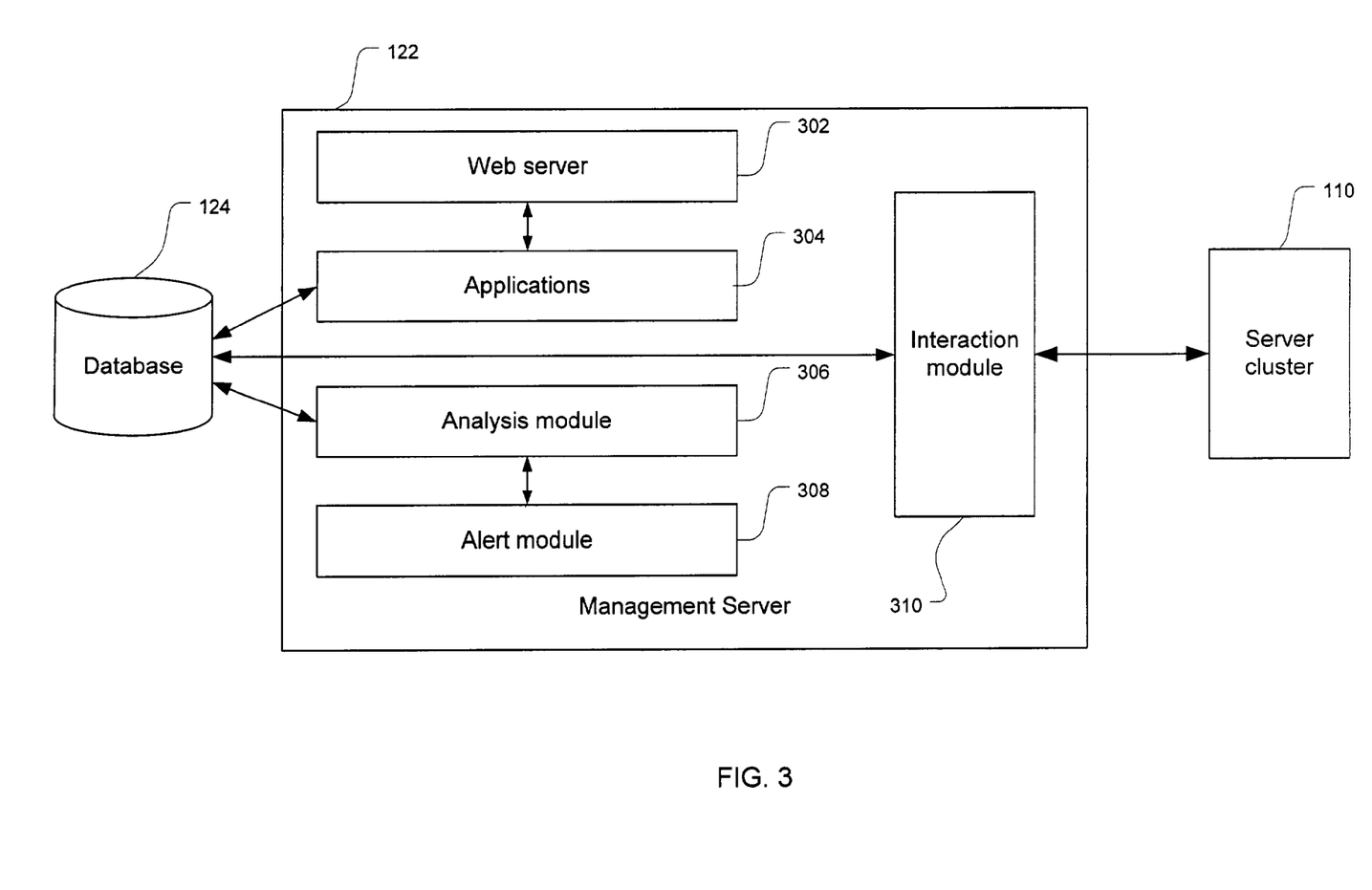
FIG. 3 illustrates details of a FIG. 1 management server in accordance with an embodiment of the present invention.

FIG. 3 illustrates details of an example embodiment of the management server 122 of FIG. 1. As shown, the management server 122 includes a web server 302, applications 304, analysis module 306, alert module 308, and an interaction module 310. The web server 302 serves web pages over the network 102 (FIG. 1) and receives the test result data transmitted by the agents 130. As discussed below, the web pages served by the web server 302 may contain the test result data, actual user data, compilations and summaries of the test result data and actual user data, and the like. Further, the web server 302 may also be used in downloading the agent 130 to a particular customer and in transmitting configuration information to the agent 130.

The applications 304 may comprise PHP applications. In one embodiment, the applications 304 are scripts useful in generating dynamic web pages to be served by the web server 122 using data from the database 124. In addition, the applications 304 pass test result data received from the agents 130 at the web server 302 to the database 124. Further, the applications 304 retrieve requested information from the database 124 and generate dynamic web pages containing the requested information for transmission by the web server 302.

The interaction module 310 interfaces the management server 122 and the database 124 with the server cluster 110 (FIG. 1). The interface module 310 may permit communication over the network 102, the link 121, or both, and retrieves services data regarding actual services provide to customer sites 104, 106, 108 from the application server 116, the database 120, or both. The interaction module 310 causes the services data to be stored at the database 124 for use by the analysis module 306. The services data include details regarding services provided, such as the date and time the services were commenced and terminated, the particular user of the services, whether the services were completed, email addresses of the users of the services, and the like. The services data may be received by the interaction module 310 from the application server 116, the web server 114, the database 120, the ping server 118, or a combination of these sources.

The analysis module 306 analyzes the services data and the test result data stored at the database 124 (FIG. 1). The analysis module 306 consolidates and generates summaries of the services data and the test result data and stores these summaries at the database 124. The applications 304 then create dynamic web pages that include the summaries of the services data and the test result data, which may then be served by the web server 302 to authorized users over the network 102. The authorized users may include customer IT personnel and service provider customer support personnel, for example.

The analysis module 306 may make a variety of reports available to users over the network 102 (FIG. 1). For example, the analysis module 306 may generate a current status report that identifies the current status of a network connection between each of a customer's sites and the server cluster 110. The current status report may include a customer site identifier for each of the customer's sites, a network address associated with each of the customer sites, and the status of the network connection between the server cluster 110 and each of the customer sites, which may be disbursed geographically. The current status report may also include latency information for each of the customer's sites.

The analysis module 306 may also generate a service record report that provides information regarding the time, type, and status of maintenance, repairs, or the like to the system. In one embodiment, the service record report lists the date and time of each service event and a brief description of the service event. The service record report may also indicate whether the service event is resolved or in progress. Further, the service record report may include a reference number associated with each entry of the service record report. Thus, customers who wish to view a report of their service records may browse to the web server 302 of the management server 122 and request, such as via a graphical user interface, the service record report. The web server 302 then transmits the service record report to the customer.

Another report that may be generated by the analysis module 306 is a latency report. The latency report may list various latencies associated with a particular customer site. The latency report may include latencies such as, DNS resolution latency, server latency, network latency, client latency, and a total latency. In one embodiment, these latencies may be expressed in milliseconds.

Further, a usage report may be generated by the analysis module 306 to provide a customer with a summary of the customer's usage of one or more services delivered by the server cluster 110 (FIG. 1). Thus, a customer may browse to the web server 302, request the customer usage report that describes services delivered by the server cluster 110 to the customer. This report may detail the customer's usage on a user-by-user basis.

In some instances, the services available at the server cluster 110 (FIG. 1) may be sold or licensed to a customer on a per-user or "per-seat" basis. That is, the customer may purchase or license the services to be provided to no more than a certain number of simultaneous or concurrent users. Optionally, the customer may purchase or license the services to be provided to only certain users at the customer site. For example, therefore, the usage report may provide the customer with information such as the maximum number of simultaneous or concurrent users of the services during a time period and the quantity of service delivered to users above the maximum number of users. The usage report may also include identifiers that identify certain individual users of the services, the total number of simultaneous or concurrent users at a particular time, or the like.

In one embodiment, the analysis module 306 identifies network connections that are not operable, network latencies, services that are not operable, and the like. The analysis module 306 also determines if measured or calculated operational parameters of the services data or the test result data are outside of certain predetermined limits. If these operational parameters are outside of certain predetermined limits, the analysis module 306 calls the alert module 308. The alter module 308 transmits alert messages to one or more of the users, the service provider, or both to notify these recipients that certain identified service or services has an operational parameter that is outside predetermined limits. The alert message may identify the service or services impaired and may provide the measured or calculated operational parameter that is outside the predetermined limits.

For example, if the analysis module 306 determines that the network latency for a particular one of the customer sites 104, 106, 108 (FIG. 1) is greater than a predetermined latency amount, the analysis module 306 calls the alert module 308. The alert module 308, in turn, generates and transmits an alert message to the customer at which the latency was identified and may provide the measured latency information.

In an alternate embodiment, the analysis module 306 only calls the alert module 308 to generate an alert message after determining that an operational parameter is outside predetermined limits for a predetermined number, such as two, consecutive tests.

The alert module 306 may also be used to send notices to customers to notify them of planned service outages, such as service outages necessary to perform system maintenance.

Operation

Figure 4:
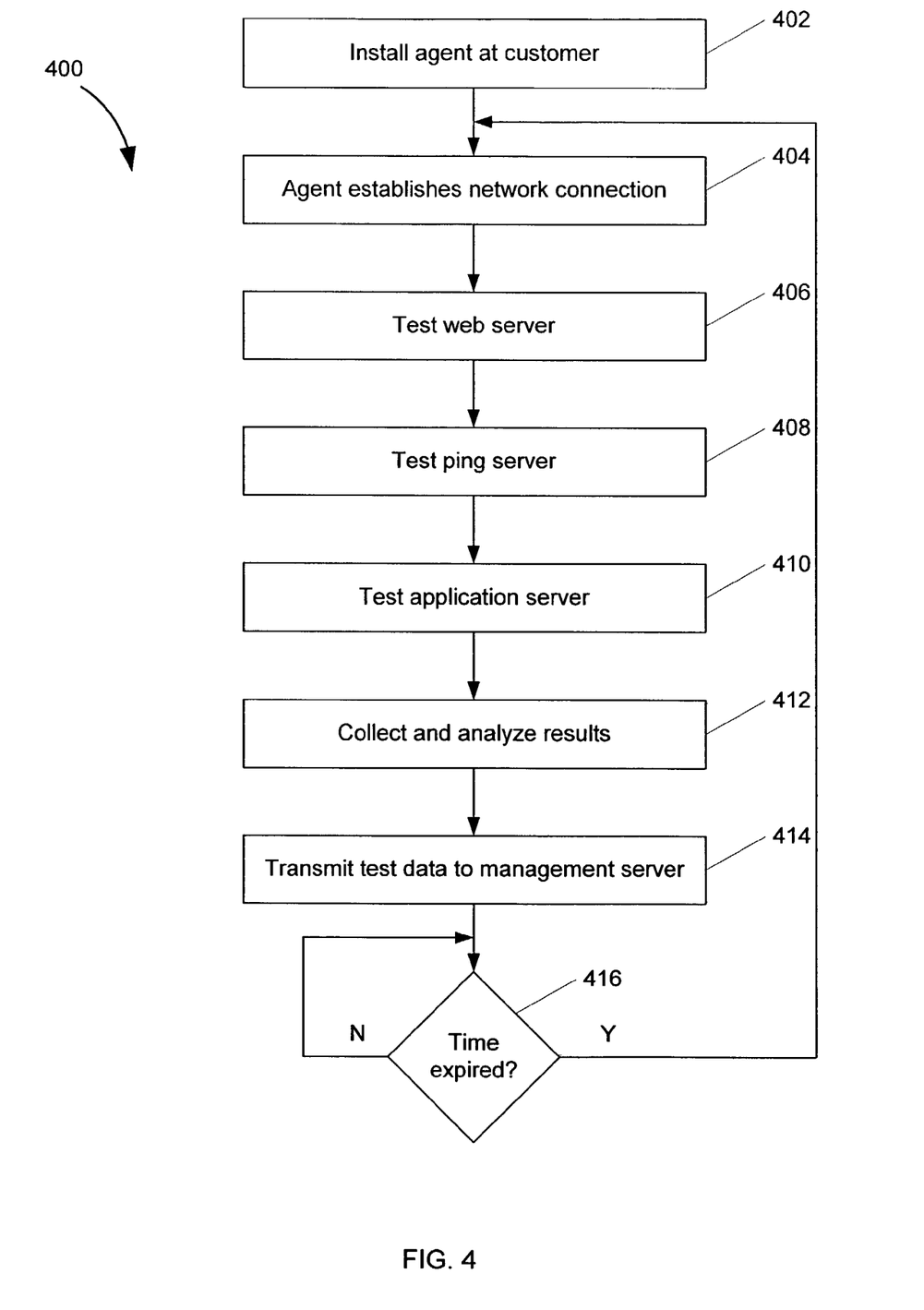
FIG. 4 is a flowchart illustrating details of the operation of a FIG. 1 agent in accordance with an embodiment of the present invention.

FIG. 4 is a flowchart 400 illustrating a method in accordance with an example embodiment. Initially, at block 402, an agent 130 (FIG. 1) is installed on a client device at one or more of the customer sites 104, 106, 108. The installation may be performed by downloading the agent 130 from the management server 122 or other server (not shown) over the network 102. Optionally, the installation may be performed by copying and running executable files associated with the agent 130 on a client device. In one embodiment, each agent 130 is installed at a client device of the customer that accesses the network 102 via a customer local area network and one or more intermediate packet forwarding devices, such as firewalls, proxy servers, gateway devices, or the like.

At block 404, the agent 130 (FIG. 1) establishes a network connection over the network 102 with the web server 114 of the server cluster 110. At block 406, the agent 130 then performs tests on the web server 114, which may be used to determine the operability of the web server 114, latencies, and the functionality of various functions of the web server 114. These tests of the web server 114 may be performed by the web server tester 206 of FIG. 2.

Next, at block 408, the agent 130 (FIG. 1) tests the ping server 118 of the server cluster 110. In particular, the testing of the ping server 118 may be performed by the ping server tester 208 as described above.

At block 410, the agent 130 (FIG. 1) tests the application server 116. The testing of the application server 116 may be performed by the application server tester 210 (FIG. 2) using the client application 216 as described above. Here, the application server tester 210 simulates user actions in receiving services delivered by the application server 116 and receives responses from the application server 116 to obtain data useful in evaluating the operability and performance of the application server 116.

At block 412, the agent 130 (FIG. 1) collects and analyzes information received from the server cluster 110 as well as latency data measured by the agent 130. The collection and analysis of data may be performed by the collection and analysis module 212 (FIG. 2) of the agent 130 as described above.

Next, at block 414, the agent 130 (FIG. 1) transmits at least a portion of the results of the analysis of block 412 over the network 102 (FIG. 1) to the management server 122.

At block 416, the agent 130 (FIG. 1) determines whether a predetermined amount of time has expired since the most recent network connection with the server cluster 110. If the agent 130 determines that the predetermined amount of time has not expired, execution returns to block 416. Else, execution returns to block 404. In one embodiment, the predetermined amount of time is in the range of about 8 to 10 minutes, although other amounts of time may be employed.

Figure 5:
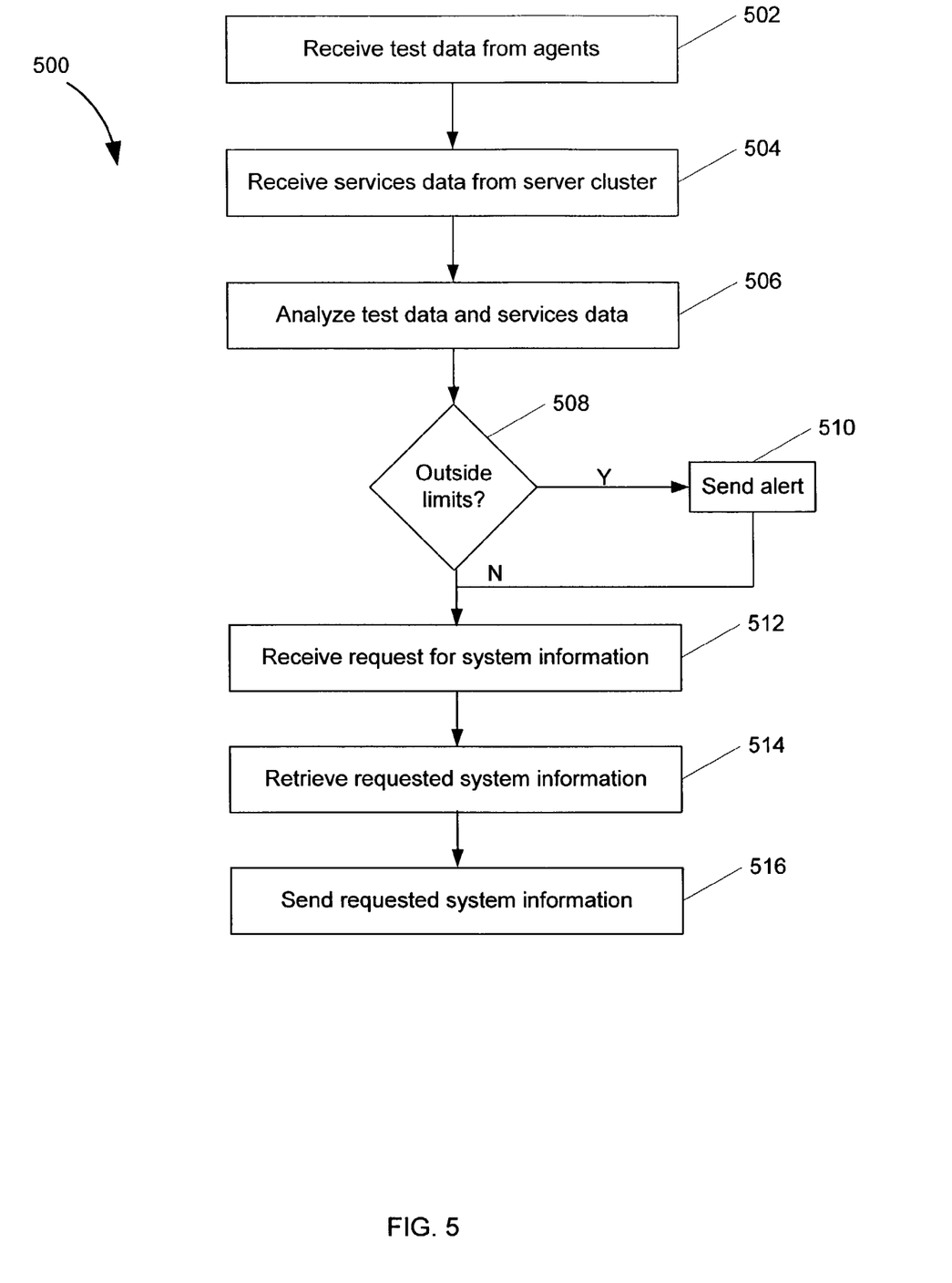
FIG. 5 is a flowchart illustrating details of the operation of a FIG. 1 management server in accordance with an embodiment of the present invention.

FIG. 5 illustrates a method 500 in accordance with an example embodiment of the present invention. At block 502, the management server 122 (FIG. 1) receives test data from the agents 130, such as via the web server 302 (FIG. 3). At block 504, the management server 122 receives services data from the server cluster 504 via the interaction module 310

(FIG. 3). Next, pursuant to block 506, the analysis module 306 (FIG. 3) analyzes the test data and the services data as discussed above.

Pursuant to block 508, if the analysis module 306 (FIG. 3) determines that either the test data or the services data is outside of predetermined limits, execution proceeds to block 510, else execution proceeds to block 512. At block 510, the alert module 310 (FIG. 3) generates an alert message as described above.

Later, at block 512, the management server 512 receives a request for system information, pursuant to block 512. The request for system information may comprise a request a particular type of system information and may be received via a graphical user interface generated by the web server 302 (FIG. 3). In response to the request for system information the applications 304 retrieve the requested information from the database 124, pursuant to block 514. Lastly, pursuant to block 516, the web server 302 (FIG. 3) transmits the requested information over the network 102 (FIG. 1).

This disclosure provides exemplary embodiments of the present invention. The scope of the present invention is not limited by these exemplary embodiments. Numerous variations, whether explicitly provided for by this disclosure or implied by this disclosure, may be implemented by one of ordinary skill in the art in view of this disclosure.

What is claimed is:

1. A method for monitoring performance of an on-line collaborative computing service, the method comprising:
    establishing a connection with an application server providing the on-line collaborative computing service over a network;
    transmitting first simulated user input over the network to the application server, wherein the first simulated user input is selected from the group consisting of creating a new meeting, joining an existing meeting, text chatting, performing document sharing, and performing application sharing;
    receiving data in response to the transmitted first simulation user input;
    analyzing the received data to generate analyzed data;
    transmitting the analyzed data over the network to a management server;
    transmitting second simulated user input requesting a plug-in over the network to a web server;
    receiving download of a plug-in in response to the transmitting the second simulated user input; and
    analyzing the downloaded plug-in to test the download of the plug-in.

2. The method for monitoring performance of an on-line collaborative computing service according to claim 1, wherein the simulated user input is transmitted from a client device over a local area network.

3. The method for monitoring performance of an on-line collaborative computing service according to claim 1, wherein the analyzing further comprises determining one or more latency values.

4. The method for monitoring performance of an on-line collaborative computing service according to claim 1, further comprising periodically repeating the establishing, the transmitting simulated user input, the receiving, the analyzing, and the transmitting.

5. The method for monitoring performance of an on-line collaborative computing service according to claim 1, further comprising:
    transmitting third simulated user input over the network to a web server;
    wherein the third simulated user input comprises a password for logging onto the web server.

6. The method for monitoring performance of an on-line collaborative computing service according to claim 1, further comprising testing a ping server associated with the application server.

7. The method for monitoring performance on an on-line collaborative computing service according to claim 1, wherein transmitting first simulated user input further comprises calling one or more programs associated with the collaborative computing service.

8. An agent stored on a computer-readable storage medium, comprising:
    a web server tester configured to establish a connection with a web server;
    an application server tester configured to establish a connection with an application server, to test a collaborative computing service delivered by the application server by transmitting data that simulates user actions in requesting and receiving the service, wherein the simulated user actions are selected from the group consisting of creating a new meeting, joining an existing meeting, text chatting, performing document sharing, and performing application sharing, and to test a plug-in download by transmitting a second simulated user input requesting a plug-in over the network to a web server, receiving download of a plug-in in response to the transmitting the second simulated user input, and analyzing the downloaded plug-in to test the download of the plug-in;
    a collection module configured to collect test result data; and
    a data transmission module configured to transmit the collected test result data to a management server.

9. The agent of claim 8, wherein the web server tester is configured to transmit login information to the web server.

10. The agent of claim 8, wherein the web server tester is configured to request a download of a file from the web server.

11. The agent of clam 8, wherein the application server tester is configured to test a plurality of different services delivered by the application server.

12. The agent of claim 8, wherein the application server tester is configured to test the service by calling a DLL program.

* * * * *